United States Patent
Zhu (10) Patent No.: US 8,508,694 B2
(45) Date of Patent: Aug. 13, 2013

(54) DISPLAY WITH DUAL-EDGE LIGHT-EMITTING-DIODE BACKLIGHT

(75) Inventor: Wenyong Zhu, Campbell, CA (US)

(73) Assignee: Apple Inc., Cupertino, CA (US)

(*) Notice: Subject to any disclaimer, the term of this patent is extended or adjusted under 35 U.S.C. 154(b) by 48 days.

(21) Appl. No.: 13/324,862

(22) Filed: Dec. 13, 2011

(65) Prior Publication Data

US 2013/0148058 A1 Jun. 13, 2013

(51) Int. Cl.
*G02F 1/1335* (2006.01)

(52) U.S. Cl.
USPC ............ 349/65; 349/58; 362/612; 362/613; 362/634

(58) Field of Classification Search
USPC ................... 349/65; 362/613, 634
See application file for complete search history.

(56) References Cited

U.S. PATENT DOCUMENTS

| | | |
|---|---|---|
| 7,237,941 B2 | 7/2007 | Hsieh et al. |
| 2004/0004827 A1 | 1/2004 | Guest |
| 2007/0081361 A1 | 4/2007 | Clary |
| 2008/0129927 A1* | 6/2008 | Hamada et al. ............... 349/65 |
| 2010/0165660 A1 | 7/2010 | Weber et al. |
| 2011/0037388 A1 | 2/2011 | Lou et al. |
| 2011/0149203 A1* | 6/2011 | Kim et al. .................... 349/62 |
| 2011/0227487 A1 | 9/2011 | Nichol et al. |

FOREIGN PATENT DOCUMENTS

| | | |
|---|---|---|
| EP | 2372225 | 10/2011 |
| JP | 2005010406 | 1/2005 |
| JP | 2009245885 | 10/2009 |

* cited by examiner

*Primary Examiner* — Richard Kim
(74) *Attorney, Agent, or Firm* — Treyz Law Group; G. Victor Treyz (57) ABSTRACT

An electronic device may have a liquid crystal display with backlight structures. The backlight structures may produce backlight that passes through display layers in the display. The display layers may include color filter elements, a liquid crystal layer, and a thin-film transistor layer. The backlight structures may have a light guide plate with opposing first and second edges. The light guide plate and other display layers may be assembled within support structures such as a metal chassis and a plastic chassis. A first strip of light-emitting diodes may be attached to the first edge of the light guide plate in a position that is floating with respect to the metal chassis. A second strip of light-emitting diodes may be attached to the second edge of the light guide plate in a position that is fixed with respect to the metal chassis.

17 Claims, 14 Drawing Sheets

DISPLAY WITH DUAL-EDGE LIGHT-EMITTING-DIODE BACKLIGHT

BACKGROUND

This relates generally to electronic devices and, more particularly, to electronic devices with displays and associated backlight structures.

Electronic devices such as computers and cellular telephones have displays. Some displays such as plasma displays and light-emitting diode displays have arrays of display pixels that generate light. In displays of this type, backlighting is not necessary, because the display pixels themselves produce light. Other displays, such as liquid crystal displays, contain passive display pixels. The pixels in a liquid crystal display can alter the amount of light that is transmitted through the display to display information for a user, but do not produce light. As a result, it is often desirable to provide backlight for a liquid crystal display.

In a typical backlight structure for a display such as a liquid crystal display, a light guide plate is used to distribute backlight generated by a light source such as a light-emitting diode light source. Optical films such as a diffuser layer and brightness enhancing film may be placed on top of the light guide plate. A reflector may be formed under the light guide plate to improve backlight efficiency.

To provide satisfactory backlighting, it may be desirable to locate strips of light-emitting diodes on the top and bottom edges of a light guide plate. The top and bottom strips of light-emitting diodes are typically fixed to a metal chassis. To accommodate thermal expansion of the light guide plate, which is attached along one of its edges to the metal chassis, conventional designs incorporate relatively large air gaps (e.g., a gap of about 0.6 mm) between the light-emitting diodes and the light guide plate. The use of such large gaps can have an adverse impact on backlight efficiency. Poor backlight efficiency, in turn, may decrease power consumption efficiency and can reduce battery life in an electronic device.

It would therefore be desirable to be able to provide electronic devices with improved displays and backlights.

SUMMARY

An electronic device may have a display such as a liquid crystal display with backlight structures. The backlight structures may produce backlight that passes through layers in the display.

The backlight structures may produce backlight that passes through the display. The display may have display layers such as a color filter layer, a liquid crystal layer, a thin-film transistor layer, and polarizer layers. The backlight structures may have a light guide plate with opposing first and second edges. The light guide plate and other display structures may be assembled within support structures such as a metal chassis and a plastic chassis to form a display module.

In the display module, a first strip of light-emitting diodes may be attached to the first edge of the light guide plate in a position that is floating with respect to the metal chassis. A second strip of light-emitting diodes may be attached to the second edge of the light guide plate in a position that is fixed with respect to the metal chassis. The light-emitting diodes may be separated from the edges of the light guide plate by narrow gaps to enhance backlight efficiency.

Further features of the invention, its nature and various advantages will be more apparent from the accompanying drawings and the following detailed description of the preferred embodiments.

DETAILED DESCRIPTION

A display may be provided with backlight structures. The backlight structures may produce backlight for the display that helps a user of a device view images on the display in a variety of ambient lighting conditions. Displays with backlights may be provided in any suitable type of electronic equipment.

Figure 1:
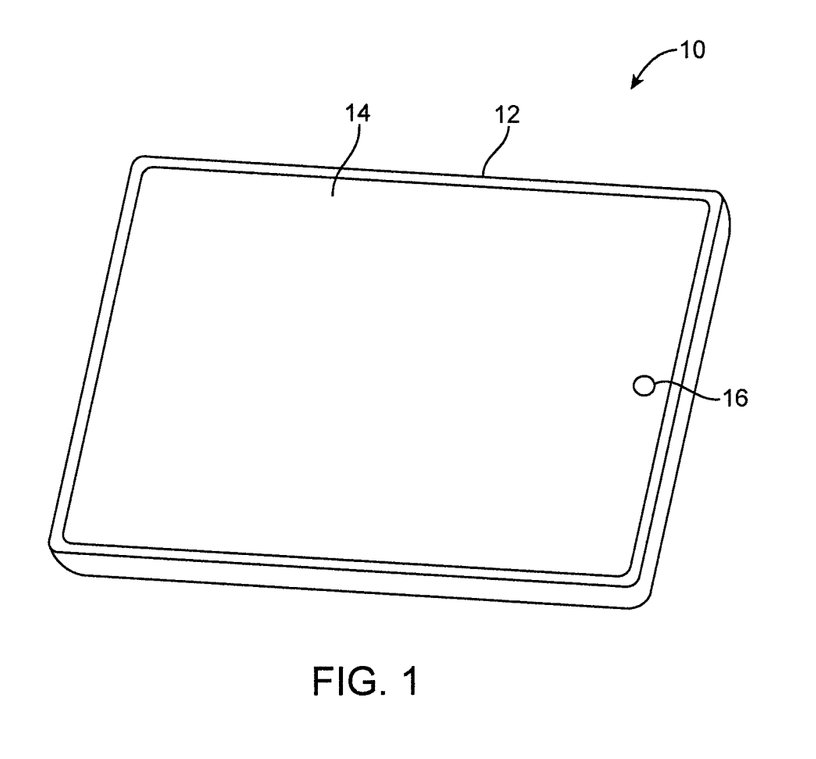
FIG. 1 is a diagram of an illustrative electronic device with a backlit display in accordance with an embodiment of the present invention.

An illustrative electronic device of the type that may be provided with a backlit display is shown in FIG. 1. Electronic device 10 of FIG. 1 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a backlit display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Figure 2:
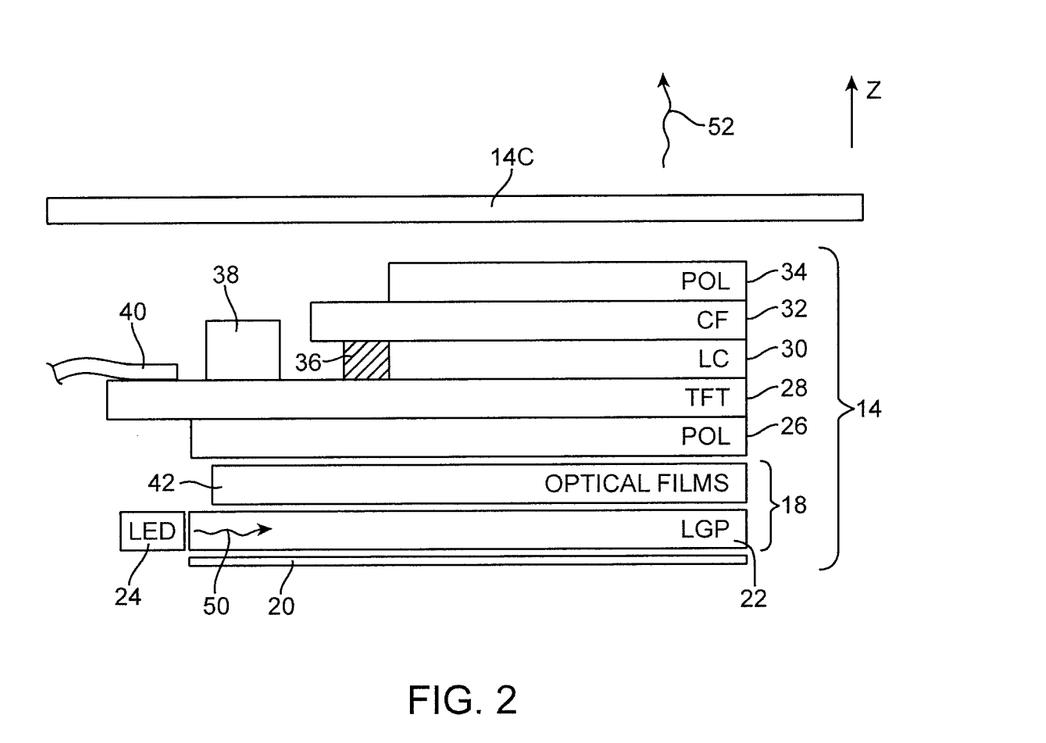
FIG. 2 is a cross-sectional side view of an illustrative backlit display in accordance with an embodiment of the present invention.

A cross-sectional side view of display 14 is shown in FIG. 2. As shown in FIG. 2, display 14 may include backlight structures (backlight unit) 18. Backlight structures 18 may include a light source such as light-emitting diode light source 24, a light-guide plate such as light-guide plate 22, optical films 42, and a reflector such as reflector 20. During operation, light-emitting diode light source 24 may emit light 50 into light guide plate 22. Light guide plate 22 may be formed from a rectangular sheet of clear plastic. Light 50 may travel within light-guide plate 22 due to the principle of total internal reflection. Light that escapes through the upper surface of light-guide plate 22 may pass through overlying display layers in direction Z and may serve as a backlight for display 14. Light that escapes through the lower surface of light-guide plate 22 may be reflected back in the upwards direction by reflector 20. Reflector 20 may be formed from a reflective material such as white plastic (as an example). Optical films 42 may include brightness enhancing film layers, diffusing film layers, and compensating film layers (as examples).

Display 14 may have an upper polarizer layer such as polarizer layer 34 and a lower polarizer layer such as polarizer layer 26. Polarizer layer 26 may polarize backlight 52. Thin-film transistor layer 28 may include a layer of thin-film transistor circuitry and an array of associated pixel electrodes. Flex circuit cable 40 may provide image data to display driver integrated circuit 38. In response, display driver integrated circuit 38 may control the thin-film transistor circuitry in layer 28 so that pixel structures such as thin-film transistor structures and associated pixel electrodes in the array of pixel electrodes on thin-film transistor layer 28 produce electric fields corresponding to image data to be displayed. The electric field produced by each electrode on thin-film transistor layer 20 adjusts the orientation of liquid crystals in an associated portion of liquid crystal layer 30 by a corresponding amount. As light travels through display 14, the adjustment of the orientation of the liquid crystals adjusts the polarization of the light that has passed through layer 30. When this light reaches upper polarizer 34, the polarization state of each pixel of light is attenuated by an amount that is proportional to its polarization, thereby creating visible images for a user.

Color filter layer 32 may contain an array of colored pixels (e.g., red, blue, and green color filter elements) for providing display 14 with the ability to form color images. Sealant 36 may be used to seal liquid crystal layer 30 within display 14. If desired, additional layers may be included in display 14 (e.g., touch sensor layers, etc.). An optional layer of transparent glass or plastic may be used to provide a protective cover for display 14, as illustrated by cover layer 14C of FIG. 2.

Figure 3:
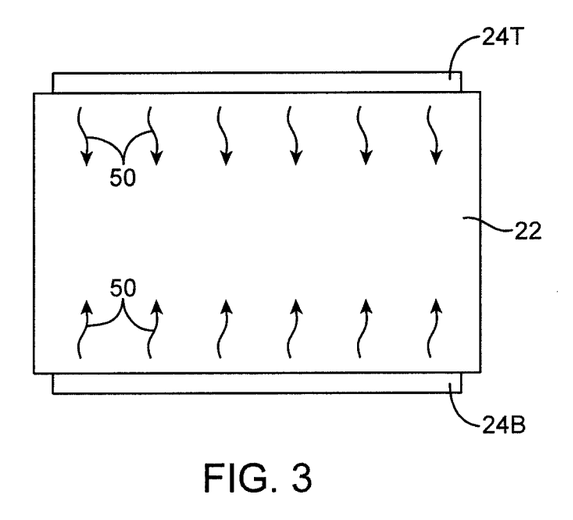
FIG. 3 is a top view of an illustrative display backlight structure showing how two strips of light-emitting diodes may be used in providing backlight for a display in accordance with an embodiment of the present invention.

To provide backlight illumination of sufficient strength and uniformity, it may be desirable to launch light 50 into light guide plate 22 from more than one edge of plate 22. As shown in the top view of light guide plate 22 of FIG. 3, for example, light 50 may be emitted into light guide plate 22 using a first strip of light-emitting diodes such as light-emitting diodes 24T along the top edge of light guide plate 22 and using a second strip of light-emitting diodes 24B along the bottom edge of light guide plate 22. As backlight travels through the pixel structures of the display layers above backlight unit 18 (FIG. 2), the pixel structures display an image for the user of device 10.

Figure 4:
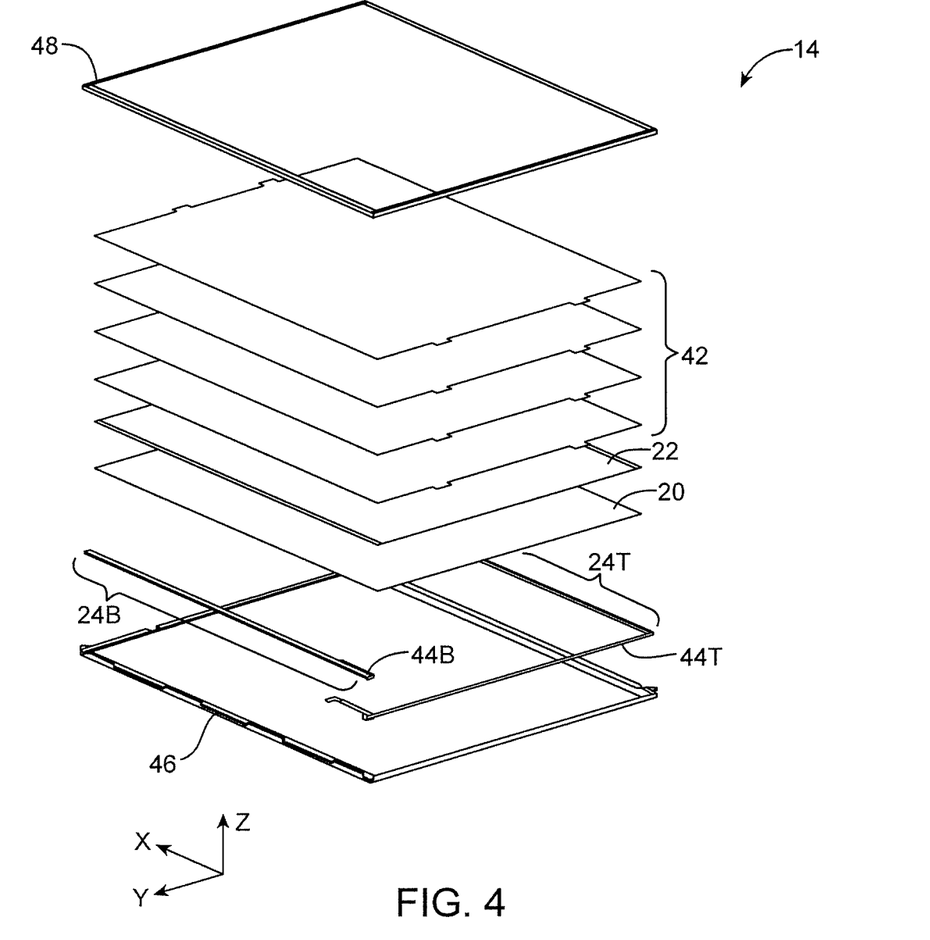
FIG. 4 is a perspective view of illustrative structures in a display module with backlight structures in accordance with an embodiment of the present invention.

FIG. 4 is an exploded perspective view of display structures that may be used in forming a display module for display 14. As shown in FIG. 4, display 14 may include support structures such as support structures 46 and 48. A top strip of light-emitting diodes such as top light-emitting diode strip 24T may be mounted on a flexible printed circuit substrate ("flex circuit") such as flex circuit 44T and a bottom strip of light-emitting diodes such as bottom light-emitting diode strip 24B may be mounted on flex circuit 44B. Flexible printed circuits such as flex circuits 44T and 44B may be formed from sheets of polyimide or other layers of polymer and may include patterned metal traces to which packaged light-emitting diodes are soldered.

Display 14 may include optical films 42, light guide plate 22, reflector 20, light-emitting diodes 24T (and associated flex circuit 44T), and light-emitting diodes 24B (and associated flex circuit 44B) mounted within support structures such as support structures 48 and 46. Display layers such as polarizer layers 26 and 34, thin-film transistor layer 28, and color filter layer 32 of FIG. 2 may also be mounted in support structures 48 and 46 (e.g., by placing these layers within the interior of support structure 48 on top of layers 42).

Support structures 48 and 46 may sometimes be referred to as chassis members or chassis structures and may be formed from materials such as plastic, ceramic, fiber composites, metal, or other suitable materials. For example, chassis 46 may be formed from a rectangular ring of metal that is sometimes referred to as a metal chassis or m-chassis, whereas chassis 48 may be formed from a rectangular ring of plastic that is sometimes referred to as a plastic chassis or p-chassis. If desired, display 14 may be formed by mounting light-emitting diodes 24T and 24B, optical films 42, and other display structures directly within housing 12 or by mounting light-emitting diodes 24T and 24B, optical films 42, and other display structures in support structures of other shapes. In the illustrative configuration of FIG. 4, rectangular ring-shaped p-chassis 48 and rectangular ring-shaped m-chassis 46 are used in forming a display module for display 14 that may be mounted within housing 12 under a display cover layer such as display cover layer 14C of FIG. 2. Other mounting configurations may be used, if desired.

To help improve backlight efficiency, it may be desirable to minimize gaps between light-emitting diodes and light-guide plate 22, while ensuring that the resulting structures will be able to accommodate thermal expansion and contraction of light-guide plate 22 during use of device 10 in hot and cold environments. With one suitable arrangement, light-emitting diodes 24T are attached light guide plate 22 along the top edge of light guide plate without being attached to surrounding support structures. This allows light-emitting diodes 24T to float with respect to the support structures during thermal expansion and contraction events, while maintaining a small separation between light-emitting diodes 24T and light-guide plate 22. At the opposing bottom edge of light guide plate 22, light guide plate 22 and light-emitting diodes 24B may be attached to support structures such as m-chassis 46 in a fixed arrangement that does not permit light-emitting diodes 24B to float with respect to m-chassis 46. As with the floating top edge of light guide plate 22, the gap between light emitting diodes and light guide plate 22 may be minimized at the fixed bottom edge of light guide plate 22 and light-emitting diodes 24B.

Figure 5:
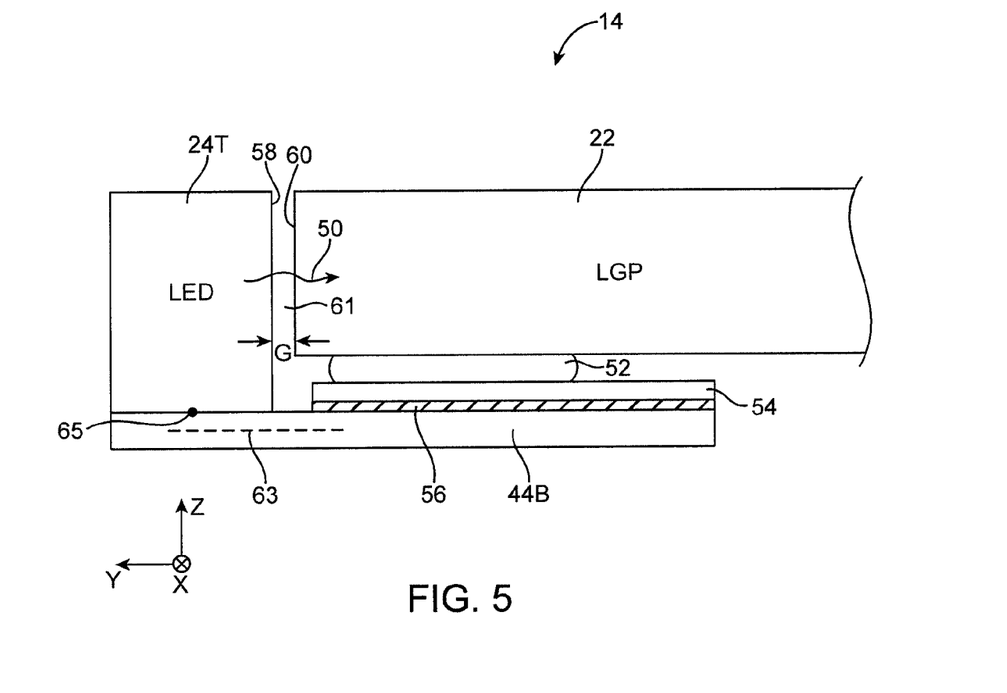
FIG. 5 is a cross-sectional side view of a light-guide plate to which a strip of light-emitting diodes has been attached in accordance with an embodiment of the present invention.

FIG. 5 is a cross-sectional side view of a portion of display 14 in the vicinity of top light-emitting diodes 24T. As shown in FIG. 5, light-emitting diodes 24T may be attached to light-guide plate 22 so that light 50 from light-emitting diodes 24T may be efficiently emitted from edge 58 of light-emitting diodes 24T into adjacent edge 60 of light guide plate 22 across gap 61. Gap 61 may be filled with air or an adhesive and may (for at least some of the light-emitting diodes 24T) be characterized by a gap width G of about 0.2 mm (e.g., less than 0.6 mm, less than 0.5 mm, less than 0.4 mm, less than 0.3 mm, less than 0.2 mm, or less than 0.1 mm). Small gap widths such as these may be achieved because it is not necessary to make gap G large enough to accommodate thermal expansion of plate 22, due to the floating position of edge 60 and light-emitting diodes 24T relative to m-chassis 46.

Light-emitting diodes 24T may extend in a strip along dimension X (into the page in the orientation of FIG. 5) and may be electrically connected to metal traces 63 in flex circuit 44B. Light-emitting diodes 24T may be, for example, soldered to metal pads in traces 63 on the upper surface of flex circuit 44B using solder 65. During operation of device 10, electrical power may be supplied to light-emitting diodes 24T using traces 63.

The relative position between light-emitting diodes 24T and light guide plate 22 along lateral dimension Y may be fixed by attaching light guide plate to flex circuit 44B. As shown in FIG. 5, light guide plate 22 may be attached to flex circuit 44B using adhesive such as optically clear adhesive 52. A reflective layer such as printed white ink or white tape such as white tape reflective layer 54 may be interposed between optically clear adhesive 52 and flex circuit 44B to help reflect light 50 into light guide plate 22. White tape reflective layer 54 may be attached to flex circuit 62 by adhesive layer 56 (e.g., adhesive on the underside of white tape reflective layer 54).

Figure 6:
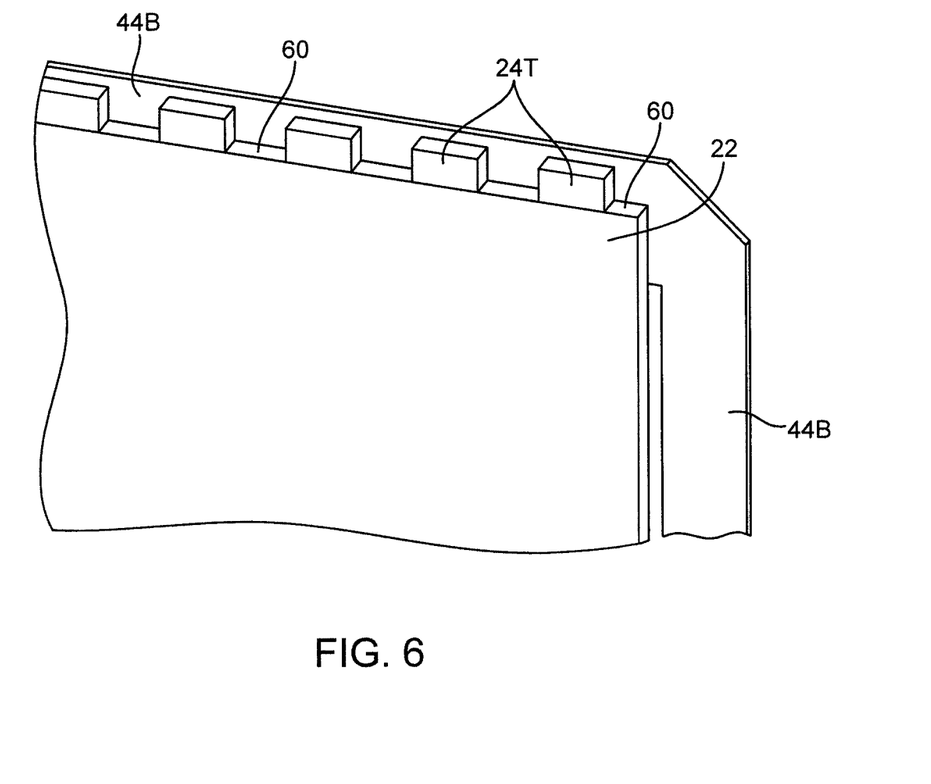
FIG. 6 is a perspective view of an upper edge of a light guide plate following attachment of a strip of light-emitting diodes in accordance with an embodiment of the present invention.

A strip of top light-emitting diodes 24T may be attached to top edge 60 of light guide plate 22 using flex circuit 44B, as shown in FIG. 5 and/or by using adhesive interposed between edges 58 and 60. A perspective view of light guide plate 22 showing how light-emitting diodes 24T and flex circuit 44B may be attached to top edge 60 of light guide plate 22 is shown in FIG. 6.

An illustrative process for installing light guide plate 22 and light emitting diodes 24 in support structures such as m-chassis 46 is shown in the cross-sectional side views of the display structures of FIGS. 7, 8, 9, 10, 11, and 12.

Figure 7:
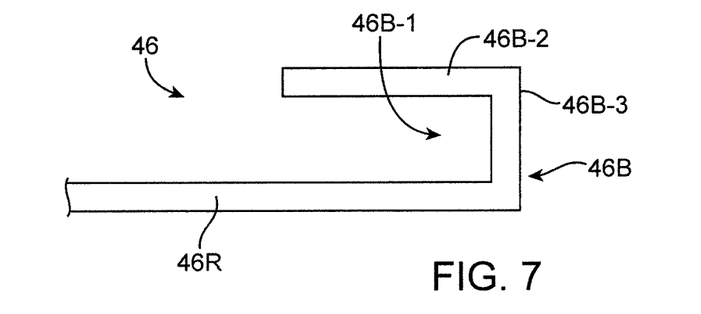
FIG. 7 is a cross-sectional side view of a bottom edge of a metal chassis structure before attachment of a strip of light-emitting diodes in accordance with an embodiment of the present invention.

A cross-sectional side view of bottom edge 46B of m-chassis 46 before installing display structures is shown in FIG. 7. As shown in FIG. 7, bottom edge 46B may have a channel such as channel 46B-1. During assembly, the edges of display layers such as light guide plate 22 may be received within channel 46B-1. Channel 46B-1 may be formed from a recess in m-chassis 46 that is formed between rear wall 46R, end wall (side wall) 46B-3, and overhanging wall 46B-2. A corresponding channel may be formed along the top edge of m-chassis 46 to receive the top edge of light guide plate 22.

Figure 8:
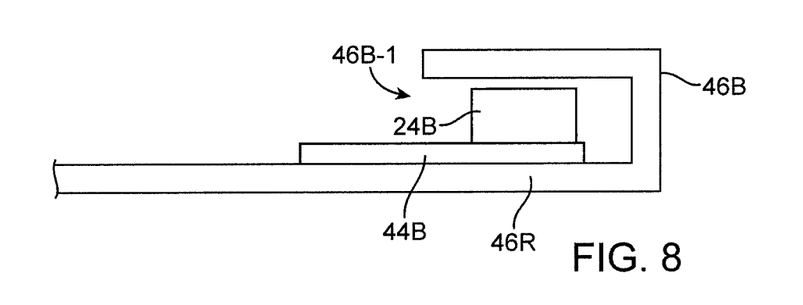
FIG. 8 is a cross-sectional side view of the bottom edge of the metal chassis structure of FIG. 7 in which a strip of light-emitting diodes has been placed to provide backlight illumination for a bottom light guide plate edge in accordance with an embodiment of the present invention.
Figure 9:
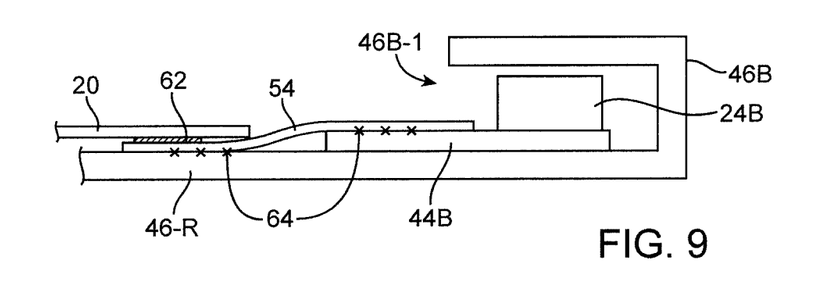
FIG. 9 is a cross-sectional side view of the bottom metal chassis structure edge of FIG. 8 to which the strip of light-emitting diodes has been attached in a fixed position using reflective tape in accordance with an embodiment of the present invention.

Initially, a strip of bottom light-emitting diodes 24B may be placed in channel 46B-1, as shown in FIG. 8. Light-emitting diodes 24B may be soldered to flex circuit 44B. Flex circuit 44B may be attached to wall 46-R using a layer of adhesive or, as shown in FIG. 9, may be attached to wall 46-R using white reflective tape 54. Tape 54 may have adhesive 64 on its underside, so that tape 54 will adhere to the upper surface of flex circuit 44B and will adhere to the surface of rear wall portion 46R of m-chassis 46. After using tape 54 to secure light-emitting diodes 24B and flex circuit 44B to bottom edge 46B of m-chassis 46 so that the position of light-emitting diodes 24B is fixed with respect to chassis 46, reflector 20 may be attached to m-chassis 46. For example, reflector 20 may be attached to tape 54 using adhesive (see, e.g., two-sided tape 62).

In the configuration shown in FIG. 9, the lower strip of light-emitting diodes (i.e., bottom light-emitting diodes 24B) and bottom flex circuit 44B are attached to m-chassis 46 and do not move relative to m-chassis 46. In subsequent assembly operations, light guide plate 22 may be mounted in a fixed relation to bottom light-emitting diodes 24B and bottom flex circuit 44B, so that the position of light guide plate 22 is fixed relative to chassis 46.

To accommodate thermal contraction and expansion in light guide plate 22, the upper edge of light guide plate may be attached to top light-emitting diodes 24T in a fixed relationship, without attaching light-emitting diodes 24T, flex circuit 44T, or the upper edge of light guide plate 22 to m-chassis 46. The bottom edge of display 14 may therefore have a light guide plate and light-emitting diode backlight source that are in a fixed position relative to chassis 46, whereas the top edge of display 14 may have a light guide plate and light-emitting diode backlight source that are in a floating position relative to chassis 46.

Figure 10:
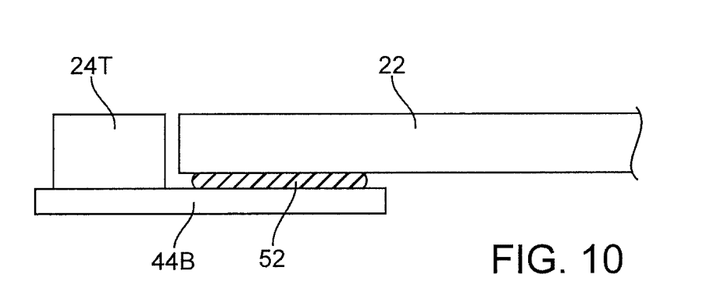
FIG. 10 is a cross-sectional side view of a strip of light-emitting diodes attached to the top edge of a light guide plate in accordance with an embodiment of the present invention.

FIG. 10 is a cross-sectional side view the upper end of light guide plate 22, showing how top light-emitting diodes 24T and top flex circuit 44B may be attached to the top edge of light guide plate 22 in preparation for installation of the top edge of light guide plate 22 in m-chassis 46. As described in connection with FIG. 5, light-emitting diodes 24T and flex circuit 44B may, for example, be attached to light guide plate 22 using adhesive 52 (e.g., optically clear adhesive that thermally cures at room temperature).

Figure 11:
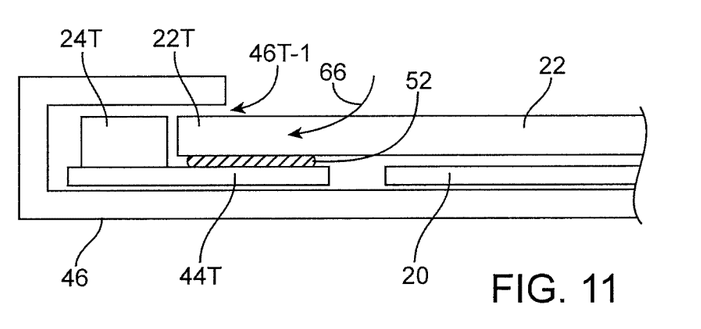
FIG. 11 is a cross-sectional side view of a top edge of the metal chassis structure during installation of the top edge of the light guide plate with the strip of light-emitting diodes of FIG. 10 so that the top edge of the light guide plate and light-emitting diodes are in a position that floats with respect to the metal chassis in accordance with an embodiment of the present invention.

After attaching the top strip of light-emitting diodes to light guide plate 22 as shown in FIG. 10, the top edge of light guide plate 22 and the attached light-emitting diodes may be inserted into top channel 46T-1 of m-chassis 46 in direction 66, as shown in FIG. 11. Flex circuit 44T may be left unattached to m-chassis 46, so that flex circuit 44T may slide freely within m-chassis 46 to accommodate thermal expansion and contraction of light guide plate 22 (i.e., the top edge of light guide plate 22 and attached light-emitting diodes 24T and flex circuit 44T may float with respect to m-chassis 46 in channel 46T-1).

Figure 12:
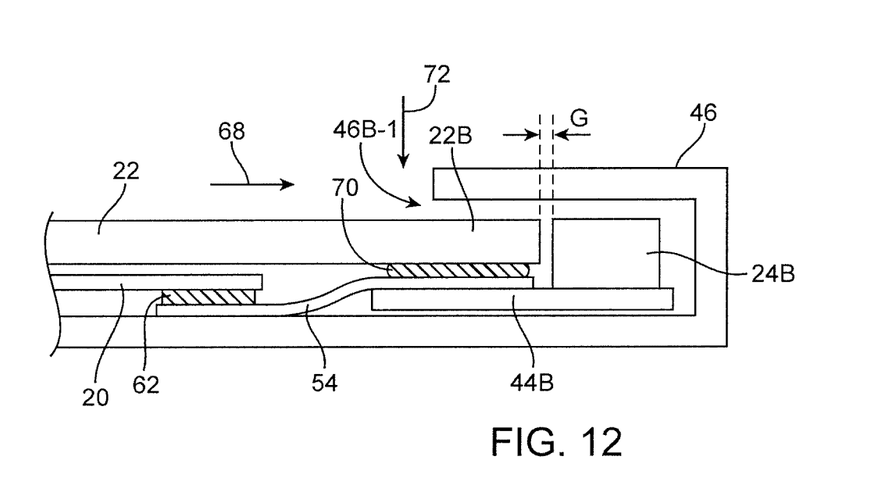
FIG. 12 is a cross-sectional side view of the bottom edge of the metal chassis structure of FIG. 9 during installation and attachment of the bottom edge of the light guide plate in accordance with an embodiment of the present invention.

After sliding top edge 22T of light guide plate 22 into top m-chassis channel 46T-1, opposing bottom edge 22B of light guide plate 22 may be inserted into bottom m-chassis channel 46B-1 in direction 68, as shown in FIG. 12. During insertion of bottom edge 22B into channel 46B-1, light guide plate 22 may move relative to m-chassis 46, while the structures that were previously attached to m-chassis 46 such as bottom light-emitting diodes 24B, bottom flex circuit 44B, and bottom reflective tape 54 remain fixed relative to m-chassis 46. Once lower edge portion 22B of light guide plate 22 has come to rest against bottom light-emitting diodes 24B, light guide plate 22 may be pressed downwards in direction 72.

When pressed in direction 72, adhesive 70 may attach light guide plate 22 to chassis 46 (via interposed structures such as reflective tape 54 and flex circuit 44B). Adhesive 70 may be, for example, optically clear adhesive. When attached in this way, light guide plate 22 will float relative to m-chassis 46 at top edge 22T of light guide plate 22 of FIG. 11 and will be fixed relative to m-chassis 46 at bottom edge 22B of light guide plate 22 of FIG. 12. By allowing edge 22B to contact at least some of the exposed surfaces of light-emitting diodes 24B before pressing downward in direction 72 to attach light guide plate 22 to m-chassis 46, the size of gap G between the lower edge of light guide plate 22 and the edge of at least some of light-emitting diodes 24B may be minimized. For example, the magnitude of G may, for most or all of light-emitting diodes 24B, be less than 0.6 mm, less than 0.5 mm, less than 0.4 mm, less than 0.3 mm, less than 0.2 mm, less than 0.1 mm, or other suitable size.

Figure 13:
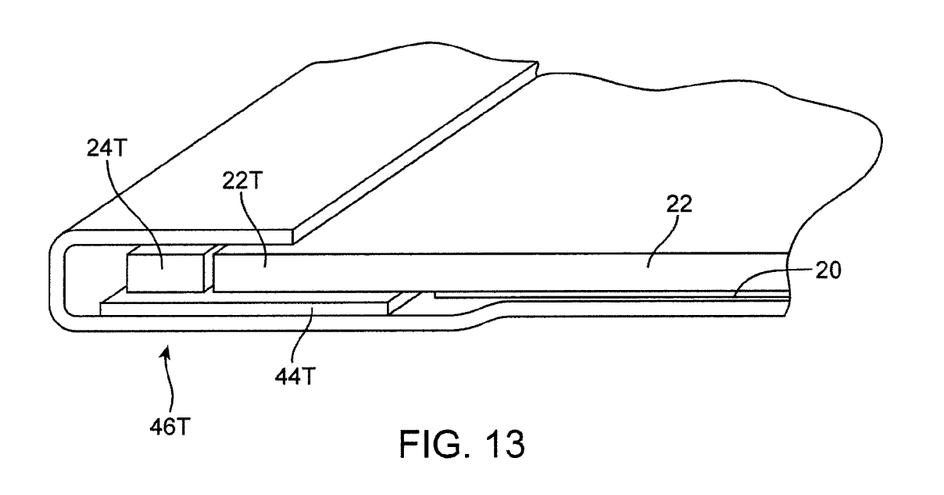
FIG. 13 is a perspective view of a top edge portion of a metal chassis with a light guide plate and associated light-emitting diodes in accordance with an embodiment of the present invention.
Figure 14:
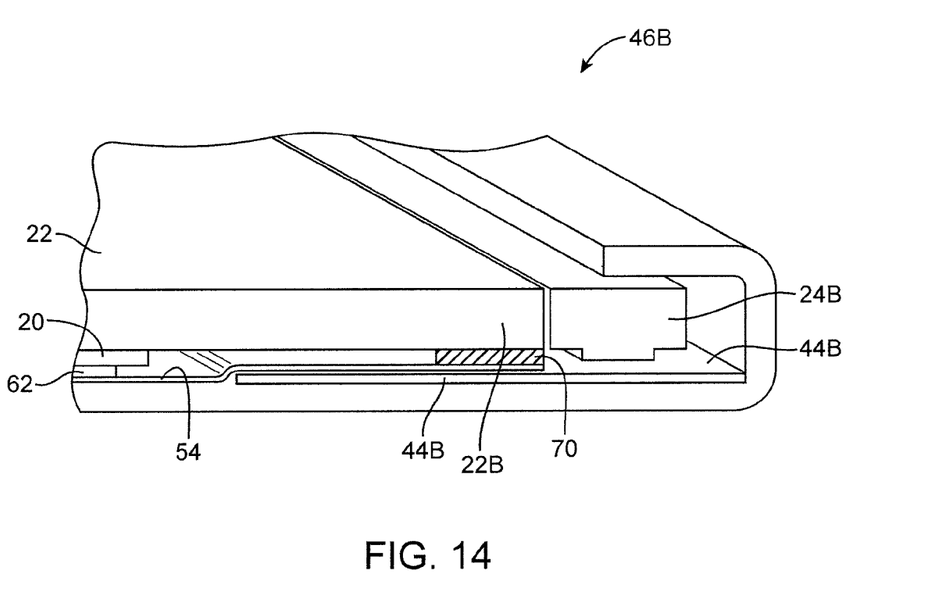
FIG. 14 is a perspective view of a bottom edge portion of a metal chassis with a light guide plate and associated light-emitting diodes in accordance with an embodiment of the present invention.

FIG. 13 is a perspective view of top portion 46T of m-chassis 46 following insertion of top edge portion 22T of light guide plate 22 and top light-emitting diode strip 24T. FIG. 14 is a perspective view of bottom portion 46B of m-chassis 46 following insertion and attachment of bottom edge portion 22B of light guide plate 22 and bottom light-emitting diode strip 24B.

Figure 15:
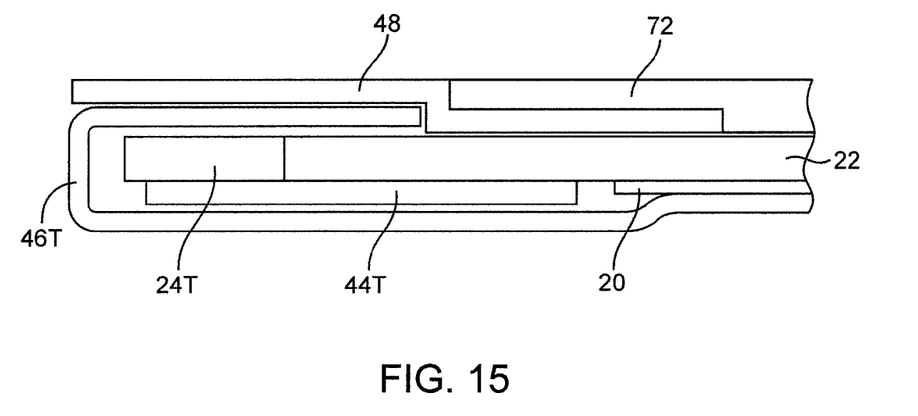
FIG. 15 is a cross-sectional side view of a top edge portion of a metal chassis and associated plastic chassis in a display module with a light guide plate and associated light-emitting diodes in accordance with an embodiment of the present invention.
Figure 16:
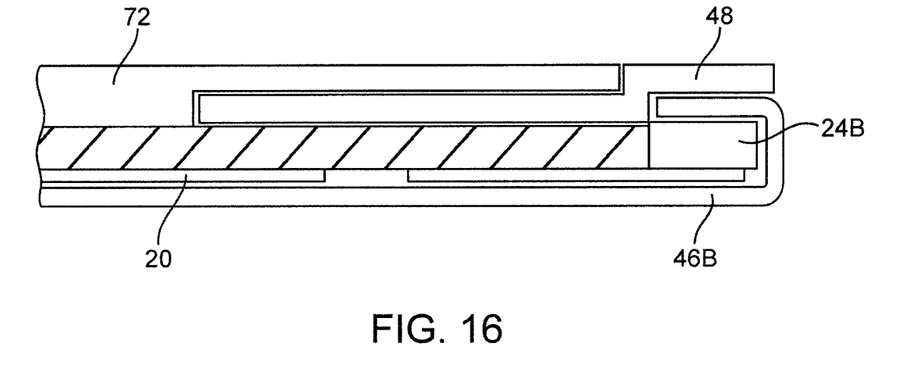
FIG. 16 is a cross-sectional side view of a bottom edge portion of a metal chassis and associated plastic chassis in a display module with a light guide plate and associated light-emitting diodes in accordance with an embodiment of the present invention.

After mounting light guide plate 22 and light-emitting diodes 24 in m-chassis 46, p-chassis 48 may be attached to m-chassis 46, as shown in FIGS. 15 and 16. Display layers 72 of FIGS. 15 and 16 (e.g., polarizer layers, thin-film transistor layers, color filter layers, and other display layers of the type shown in FIG. 2) may then be mounted in the rectangular inner opening of p-chassis 48 to form a display module for display 14.

Figure 17:
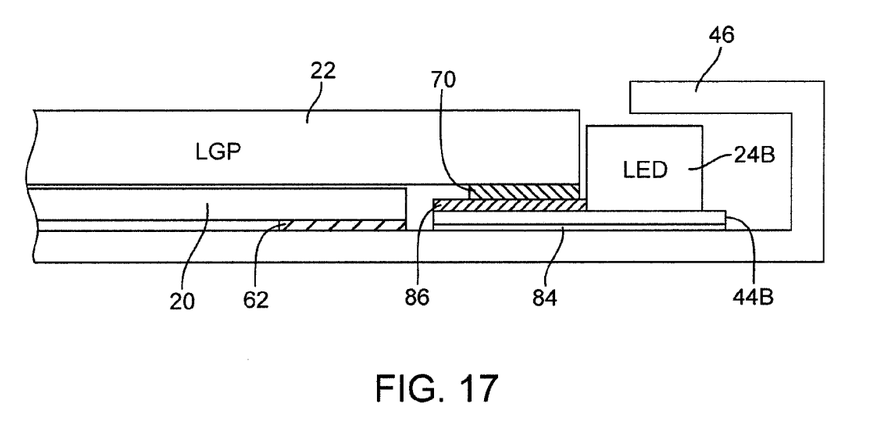
FIG. 17 is a cross-sectional side view of a bottom edge portion of a metal chassis and light guide plate and associated light-emitting diodes in an arrangement in which a layer of white ink has been formed on a light-emitting diode flex circuit substrate to serve as a reflective layer in accordance with an embodiment of the present invention.

If desired, the reflective properties of white reflective tape 54 may be provided using white ink such as white ink 86 of FIG. 17. White ink 86 may be deposited on a flex circuit such as flex circuit 44B on which light-emitting diodes 24 are mounted using screen printing or other suitable deposition technique. White ink 86 may be printed on upper flex circuit 44T (e.g., for use in place of white reflective tape 54 of FIG. 5). As shown in FIG. 17, flex circuit 44B may be attached to m-chassis 46 using adhesive such as two-sided tape 84.

Figure 18:
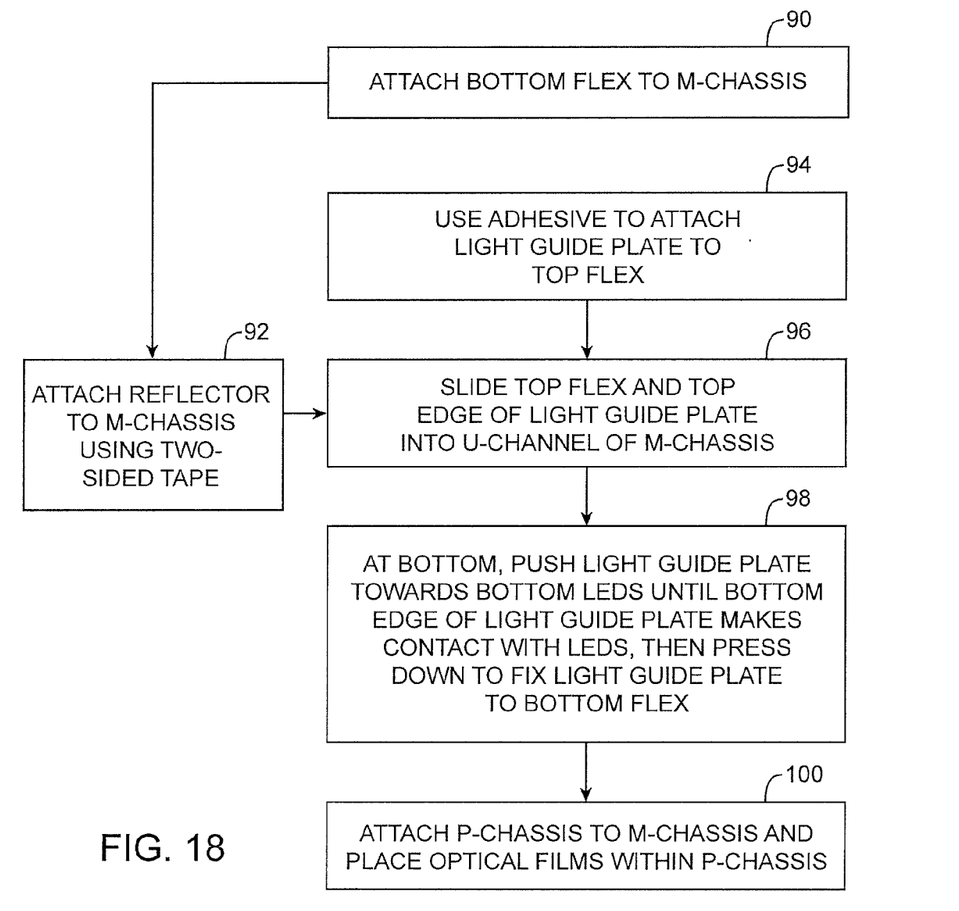
FIG. 18 is a flow chart of illustrative steps involved in assembling display structures for a display with a dual-edge light-emitting diode configuration in accordance with an embodiment of the present invention.

Illustrative steps involved in assembling display 14 (e.g., assembly operations for forming a display module or other display structures formed using support structures such as m-chassis 46 and p-chassis 48 or other suitable support structures) are shown in FIG. 18.

At step 90, bottom flexible substrate 44B and the strip of light-emitting diodes 24B that are mounted on substrate 44B may be attached to m-chassis 46. Bottom flexible substrate 44B may, for example, be attached to m-chassis 46 using reflective tape 54 (FIG. 9), using two-sided tape, or using other suitable attachment mechanisms (e.g., adhesive, fasteners, etc.).

Following attachment of flexible substrate 44B and light-emitting diodes 24B to m-chassis 46 in the bottom channel of m-chassis 46, reflector 20 may, as step 92, be attached to m-chassis 46 (e.g., using adhesive such as two-sided tape 62 of FIG. 9 or other attachment mechanisms).

At step 94, the upper end of light guide plate 22 may be prepared for mounting to m-chassis 46. In particular, light-emitting diodes 24T and flexible substrate 44T may be attached to top edge portion 22T of light guide plate 22, as shown in FIG. 10.

At step 96, the top of light guide plate 22 (e.g., top portion 22T and attached flexible substrate 44T and top light-emitting diode strip 24T) may be slid into U-shaped channel 46T-1 of m-chassis 46 (FIG. 11).

At step 98, the bottom of light guide plate 22 (e.g., bottom portion 22B) may be slid in direction 68 of FIG. 12 until portion 22B of light guide plate 22 touches bottom light-emitting diodes 24B (e.g., so that there is a gap G of less than 0.6 mm, less than 0.5 mm, less than 0.4 mm, less than 0.3 mm, less than 0.2 mm, or less than 0.1 mm between the edge of light guide plate 22 and some or all of light-emitting diodes 24B). Once light guide plate 22 has come to rest against the lower strip of light emitting diodes, light guide plate portion 22B may be pressed downwards in direction 72 (FIG. 12) to attach light guide plate 22 to m-chassis 46 with optically clear adhesive 70 (FIG. 12). Adhesive 70 may cure thermally (e.g., at room temperature), thereby fixing the position of light guide plate 22 relative to the bottom strip of light-emitting diodes and m-chassis 46. The top edge of light guide plate 22 is not attached to m-chassis 46 (i.e., the top edge of light guide plate 22 is floating), so thermal expansion and contraction events can be accommodated. The process of attaching top light-emitting diodes 24T to light guide plate edge 22T (step 94) and the process of attaching light guide plate 22 to flex 44B (and thereby m-chassis 46) after placing light guide plate 22 against light-emitting diodes 24B may help minimize the size G of the gaps that are created between light emitting diodes 24 and the upper and lower edges of light guide plate 22. Particularly in configurations with small G (e.g., when G is less than 0.2 mm or is less than 0.1 mm), coupling efficiency between light-emitting diodes 24 and light guide plate 22 may be enhanced.

During the operations of step 100, display module assembly operations may be completed by attaching p-chassis 48 and m-chassis 46 as shown in FIGS. 15 and 16 and by including optical films 42 and other display layers (see, e.g., the layers of FIG. 2) into the display module (e.g., as layers 72 of FIGS. 15 and 16). The assembled display module may then be installed in device 10 to serve as display 14 (e.g., by installing the display structures under a display cover layer such as cover layer 14C of FIG. 2).

The foregoing is merely illustrative of the principles of this invention and various modifications can be made by those skilled in the art without departing from the scope and spirit of the invention.

What is claimed is:

1. A display, comprising:
   at least one display layer having structures configured to display and image; and
   a backlight unit configured to produce backlight that passes through the at least one display layer, wherein the backlight unit includes a support structure, a light guide plate, first and second strips of light-emitting diodes coupled to the light guide plate at opposing first and second edges of the light guide plate, wherein the first strip of light-emitting diodes at the first edge of the light guide plate has a position that is floating relative to the support structure, and wherein the second strip of light-emitting diodes at the second edge of the light guide plate has a position that is fixed relative to the support structure.

2. The display defined in claim 1 wherein the support structure comprises a rectangular ring-shaped chassis.

3. The display defined in claim 2 wherein the rectangular ring-shaped chassis comprises a metal chassis.

4. The display defined in claim 3 further comprising a rectangular ring-shaped plastic chassis.

5. The display defined in claim 1 wherein the at least one display layer comprises a liquid crystal display thin-film transistor layer.

6. The display defined in claim 1 further comprising a substrate with which the first strip of light-emitting diodes is attached to the first edge of the light guide plate, wherein the substrate floats with respect to the support structure.

7. The display defined in claim 6 wherein the substrate comprises a flexible printed circuit.

8. The display defined in claim 1 further comprising a first substrate with which the first strip of light-emitting diodes is attached to the first edge of the light guide plate and a second substrate to which the second strip of light-emitting diodes is connected.

9. The display defined in claim 8 wherein the first substrate comprises a first flexible printed circuit and wherein the second substrate comprises a second flexible printed circuit.

10. The display defined in claim 9 wherein further comprising adhesive with which the second flexible printed circuit is coupled to the light guide plate.

11. The display defined in claim 10 further comprising a structure that attaches the second flexible printed circuit to the support structure.

12. The display defined in claim 11 wherein the structure that attaches the second flexible printed circuit to the support structure comprises tape.

13. The display defined in claim 12 wherein the tape comprises white reflective tape.

14. A display, comprising:
    a chassis;
    a first strip of light-emitting diodes;
    a second strip of light-emitting diodes; and
    a light guide plate having opposing first and second edges that are configured to respectively receive light from the first and second strips of light-emitting diodes, wherein the first strip of light-emitting diodes is attached to the light guide plate at the first edge and has a position that floats relative to the chassis and wherein the second strip of light-emitting diodes has a position that is fixed relative to the chassis and the second edge.

15. The display defined in claim 14 wherein the first strip of light-emitting diodes is separated from the first edge of the light guide plate by a gap of less than 0.2 mm and wherein the second strip of light-emitting diodes is separated from the second edge of the light guide plate by a gap of less than 0.2 mm.

16. The display defined in claim 15 further comprising adhesive with which the light guide plate is mounted to the chassis at the second edge.

17. The display defined in claim 16 wherein the second strip of light-emitting diodes comprises a flexible printed circuit substrate and wherein the adhesive attaches the light guide plate to the flexible printed circuit substrate, the display further comprising tape that attaches the flexible printed circuit to the chassis so that the second edge has the position that is fixed relative to the chassis.

* * * * *